July 13, 1954 R. PICAND ET AL 2,683,301
PRECISION TOOLHOLDING REVOLVING
CAPSTAN FOR MACHINE-TOOLS
Filed Oct. 21, 1948 3 Sheets-Sheet 3

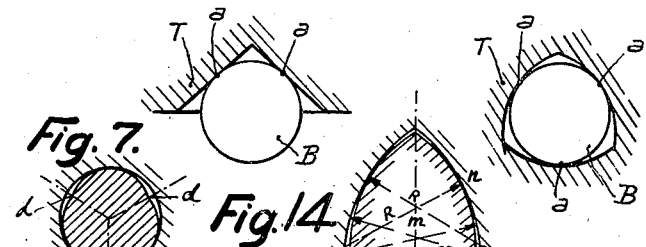
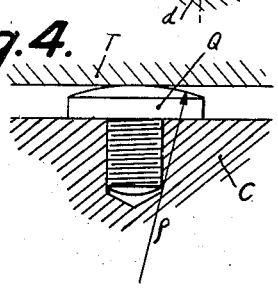
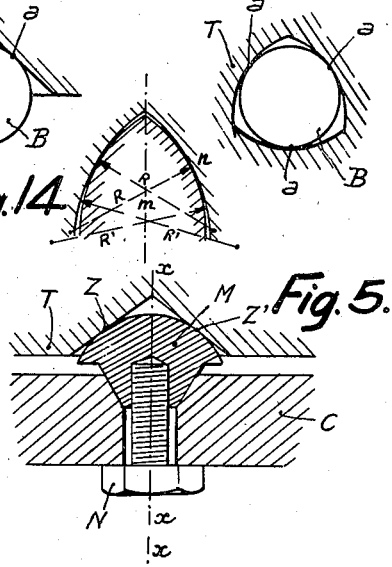
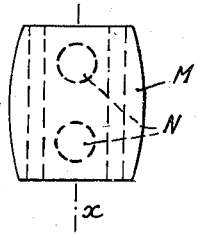
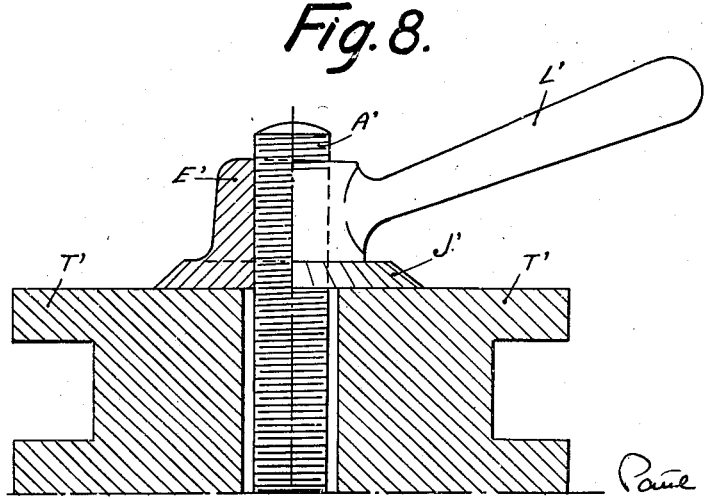

UNITED STATES PATENT OFFICE 2,683,301

PRECISION TOOLHOLDING REVOLVING
CAPSTAN FOR MACHINE TOOLS

Roland Picand, Angers, and Paul Cayère,
Grenoble, France

Application October 21, 1948, Serial No. 55,784

Claims priority, application France
October 22, 1947

7 Claims. (Cl. 29—48)

Our present invention relates to a revolving turret head adjustment means for a machine tool.

One of the objects of our present invention is to provide a means for setting the turret head at its various working positions, which utilizes a combination of three supports which are different in nature from each other.

It is a further object of our present invention to provide a means for setting the turret head at its various working positions without in any way using the shaft about which the turret head turns except as a means for clamping the turret head to the carriage on which it is supported.

The above-mentioned three supports for the turret head are:

(a) A support having three supporting points of tangency or contact, which is hereinafter referred to as a bore support. This type of support may take the form of a substantially conical recess in which a sphere or a pin head having a curved surface is seated, or the form of a depression having a surface of revolution which engages with a three lobed or three bossed pin.

(b) A support having two supporting points of tangency or contact, hereinafter referred to as a line support. This support may take the form of a groove having an inverted V section in which is seated a sphere or a pin head having a curved surface, or the form of a pin having two lobes or bosses contacted by a recess whose interior surface is tangent to the two lobes or bosses.

(c) A support having one supporting point of tangency or contact hereinafter referred to as a plane support. This form of support may take the form of a sphere or a projection bearing against a plane surface.

Thus it is seen that a means for setting the turret head in its various working positions is provided in which there are six supporting points of tangency or contact. The shaft about which the turret head is turned does not contribute in any way to the setting of the turret head and serves solely to support a device for clamping the turret head to the carriage in its various working positions.

With the above objects in view our present invention mainly consists of a machine tool having a carriage with an upper face; a turret head rotatably mounted on said carriage so as to be rotatable between several working positions and having a lower face located adjacent and parallel to said upper face of said carriage; a first supporting projection arranged on one of said faces, projecting towards the other of said faces and engaging the same at one point at each working position of said turret head; a second supporting projection arranged on one of said faces; a third supporting projection arranged on one of said faces; a plurality of depressions distributed over at least one of said faces, said supporting projections and depressions being arranged and shaped in such a manner that, at any working position of the turret head, said second supporting projection engages one of said depressions at two points of contact and said third supporting projection engages another of said depressions at three points of contact; and means for clamping said turret head to said carriage at any one of said working positions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings:

Figs. 2–7 are fragmentary, partly sectional views of various embodiments of male elements and supports adapted to be used in machines according to the invention, such as that shown in Figs. 4 and 9;

Fig. 8 is a fragmentary, partly sectional, elevational view of an embodiment different from that of Fig. 1 for clamping the turret of the machine tool in one of its several working positions;

Figure 1:
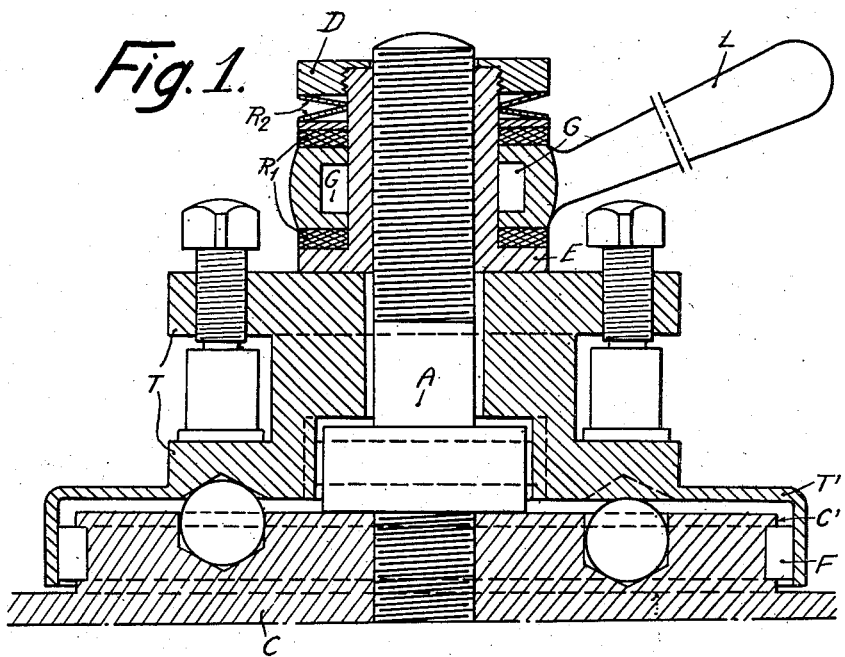
Fig. 1 is a sectional elevational view showing the details of a capstan according to the invention.

It will be remarked that the setting of the capstan is performed entirely by the "bore-line-plane" system, the capstan shaft A, fitted with a nut E or any like tightening means (Fig. 1) intervening only for the locking of the capstan in one of the working positions.

In the embodiments described hereinafter or in any other like embodiments, the male elements and the setting supports can be realized in various forms, amongst which will be chosen the types best adapted to the particular type of machine concerned.

The embodiment shown in Figs. 2 and 3 includes a ball or like element accommodated in a "bore" to provide a three-point contact. In this embodiment the recess in the form of a hollow pyramid, triangular for instance, having either plane or curved faces: in this case the contact takes place on three points $a$, and this results in precision in the setting of the capstan T with respect to the carriage.

In the modification shown in Fig. 4, the ball is replaced by a projection Q having a spherical head of radius P presenting a large radius curve, projection Q being fixed to carriage C and engaging the planar underface of turret T at one point of contact. The example shown relates to a "plane" guide forming a one-point contact. The modification illustrated in Figures 5 and 6 shows a "line" or two-point contact element. In this embodiment, the part M fixed in the carriage C by means of the screw N is ovoidal in shape, formed by two curves, one of which can be seen in the section illustrated in Fig. 5, the other, not visible in the drawings, on the $x-x$ plane. The radii of the curves at the points contact ZZ' of the element M with the inverted V section groove machined in the turret, can, in these conditions, be very great. This arrangement permits to obtain at the points of contacts Z and Z' surfaces of contact much greater than would be obtainable with a ball, thus reducing the deformations and increasing the precision.

It is also possible to obtain a three-point contact with a three bossed projection, as shown in Fig. 7, comprising three round bosses $d$, the recess having the shape of a cone or surface of revolution.

In the above mentioned forms of embodiments, it has been supposed, in a general manner, that in systems of this kind, the "line" and the "plane" are realized by utilizing in combination with a ball borne by one of the two assemblies (capstan or carriage), a linear guiding part formed by a groove for the "line," machined or arranged in the other assembly, and for the "plane" a true plane surface perpendicular to the shaft. But it will be noticed that the supporting surfaces of the "line" and of the "plane" corresponding to the working positions of the capstan are limited to accurately registered contacts, so that "line" can be realized in practice by a guide preventing any rotation about the "bore," and the "plane" by a contact for each setting position, these contacts being as a whole contained in a plane substantially perpendicular to the rotation axis of the capstan.

In order to increase still the degree of precision, it will be advantageous to provide the capstan with a torque limiter, enabling to maintain the locking compressive force within constant limits. In this view, and as it is illustrated in Fig. 1, the fixation shaft of the capstan A, on the carriage C of the lathe, can be fitted with a tightening nut E provided for the adjustment of the compressive force exerted by the capstan on the carriage. L shows the operating lever for the tightening; $R_1$ indicates the fiber washers or the like, presenting a great friction coefficient with the nut E and the lever L. $R_2$ is a compression type spring constituted for instance by split spring washers; D is a nut screwing on the nut E and provides for the adjustment of the degree of compression of the spring $R_2$ and accordingly the degree of tightening between the spring washers $R_1$ and the parts L and E. Thus, it will readily be understood that when the locking lever L is actuated in order to tighten the nut E on the mounting shaft A, the torque imparted to E from L by friction between the spring washers $R_1$ and the parts L and E will be maintained and limited to the desired value by adjustment of the tension of the spring $R_2$. Thus this device constitutes the torque limiter, the advantages of which have been enumerated above. A thrust bearing could be interplaced between E and the capstan T in order to reduce the friction torque communicated during the tightening of E.

The modification illustrated in Fig. 8 gives a particularly simple, dynamometrical type of solution for the adjustment of the compressive force exerted by the capstan on the carriage. In this example A' is the mounting shaft, and the threaded part of this shaft serves at the same time as a bolt for the tightening nut E, L' is the maneuvering lever for the tightening; the latter is integral with the nut E'. This nut is calibrated at J' on its lower part, and marks for this calibration are provided on the top part of the capstan T'. Thus, by returning always to the same mark on the calibration, the compressive force along the shaft A' and the tightening torque developed between E' and the capstan T' are always identical, and this gives the same results as in the above described arrangement. It will be remarked that in this modification, much simpler, the shaft A' acts as a traction type dynamometer due to its elasticity. In order to increase this elasticity, a spring, constituted for instance by spring washers, could be inserted between E' and T'. A thrust bearing could also, as in the preceding solution, be inserted between E' and T', in order to diminish the friction torque.

Finally, Figure 1 illustrates how the projections, shown here in the form of balls, and their guides can be protected from foreign matter (liquid, dust, shavings). The lower part of the capstan T is bell-shaped, as in T', enclosing the cylindrical part C' of the carriage C. A joint F, made of felt or any similar material, prevents foreign matter from soiling the balls and their guides without hindering the proper centering of the capstan resulting from the balls moving into their guides. The arrangement of Figure 10 may also be adopted in which a soft leather cylinder, or made of any other suitable material, attached to the capstan, caps a cylindrical bossing machined on the carriage.

Figure 9:
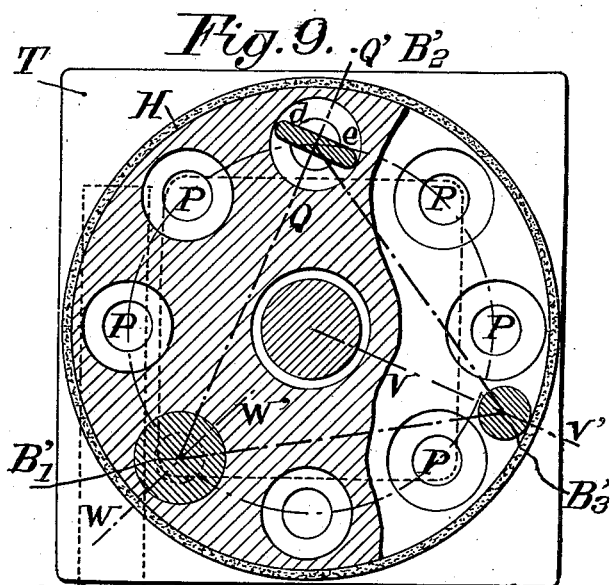
Figs. 9 and 10 are partly sectional plan and elevational views, respectively, of a carriage and turret constructed in accordance with the present invention.
Figure 10:
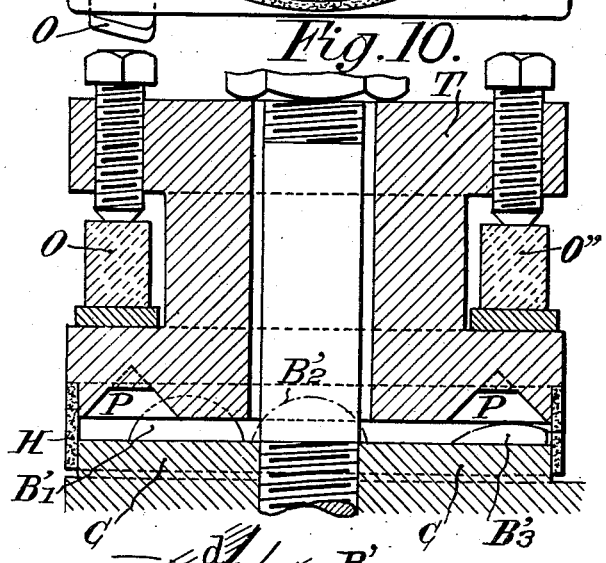
Figure 11:
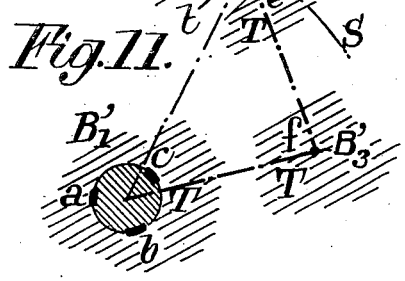
Fig. 11 is a diagrammatic illustration of the manner in which the structure of the invention operates.

Amongst the different forms of embodiments of the invention we shall make a special mention of the form which consists in giving a standard shape to all the sockets constituting the "bore" and the "line" supports and to arrange them appropriately around the shaft of the capstan; the "bore" or "line" characteristics depending on the particular conformation of the male elements. This form of embodiment, which is illustrated in Figs. 9-11, is mainly characterized by the following arrangements:

(a) The setting surfaces of the capstan or the like, for instance surfaces of revolution such as frusto-truncated surfaces, serve successively, for the various positions of the capstan, as bore and then as line supports.

(b) These surfaces can be as many as the available space will permit, and distributed appropriately along a circumference, in order to obtain several working positions of the capstan with only one single ball (or like element) device.

(c) By preference, the setting surfaces of the line and of the bore supports are of revolution, and the male counterparts comprise three bossings for the bore support and two appropriately centered bossings for the line supports.

Referring to Figs. 9–11, it can be seen that the device comprises setting surfaces P, which are bowl shaped or in the form of sockets, or having a frusto-truncated or simlar form, evenly distributed along a circumference concentric to the capstan.

The projection B' fits into one of these recesses, and bears on the surface of this recess by its periphery at three points $a, b, c$.

In another recess or socket P spaced from the first by approximately a third of a circle, fits the projection B'$_2$ which constitutes the line-support providing a two-point contact. The projection B'$_2$ is elongated and bears at its opposite ends in the socket P at two points $d$ and $e$. Thus it constitutes a two-lobed finger. The finger machined in this manner is arranged as shown in Fig. 9, so that the line $d—e$ passing through the two points of contacts, lies in a plane substantially perpendicular to the line B'$_1$—B'$_2$.

Thus the contacts $d$ and $e$ always take place on a small fraction of the area of the socket P, fraction which is identified on a short but actually sufficient length. Due to this arrangement, the socket P, when receiving the finger B'$_2$ becomes a line-support, whereas it acts as a bore-support when it lodges finger B'$_1$.

The spacing of the fingers B'$_1$ and B'$_2$ is realized so as to be as near as possible equal to the spacing of the sockets P utilized by these fingers; the unavoidable minute differences between these two intervals do not affect the resetting of the capstan, because the finger B'$_2$ can move out of its axis by several tenths of millimeter with respect to its socket, sliding in the line-support part of the latter.

Finally, the plane-support is constituted by the finger B'$_3$, Figs. 9 and 10, arranged so as to drop on the free plane surface remaining between two consecutive sockets P (Fig. 16).

Of course the fingers B'$_1$, B'$_2$, B'$_3$ could be arranged on the capstan T, and the sockets P on the carriage C. In Fig. 9, the bore-support B'$_1$ has been placed in the immediate vicinity of the tool O, but the socket P and the resetting fingers could occupy any other position with respect to the tools borne by the capstan.

Thus the neutralization of the six degrees of liberty of the capstan T has been realized, as diagrammatically shown in Fig. 11, by six contacts arranged in the following manner: 3 contacts $a, b, c$, on the bore-support B$_1$; 2 contacts $d$ and $e$ on the line-support B$_2$; 1 contact $f$ on the plane-support B$_3$, totalizing $3+2+1=6$ contacts.

The finger B'$_1$ centers itself in its socket, and the capstan pivots as a whole about B'$_1$; thus, the finger B'$_2$ describes a sphere having B'$_1$ for center and when it bears on the side of the line $t$ the center of this finger B'$_2$ is fixed and the capstan can only move around the axis B'$_1$, B'$_2$.

The blocking action of the finger B'$_3$ on the plane-support insures then a perfect blocking and positioning of the capstan.

By capstan, or turret, we mean, in the present specification, any tool or work-piece support which can be adapted on the carriage of a machine-tool, the said capstan, or turret, constituting thus a tool-holding device; the number of tools or work-pieces can be determined at wish, and can also be reduced to a single tool or work-piece.

Moreover, and namely for quantity production, the invention permits to mount the same tool or work-piece holding capstan-support, on different consecutive machines. All the machining operations could thus be positioned with respect to each other with a great degree of precision, by means of the hereinbefore described sockets and fingers.

In this specification and in the claims which follow, the phrase "point of contact" is not intended to mean a theoretical point of contact having absolutely no area but is instead intended to read upon a localized area of contact, between two members, which approaches in actual practice a theoretical point of contact.

We claim:

1. In a machine tool, in combination, a carriage member; a turret member formed with a bore; a shaft fixed to said carriage member and extending through said bore to guide said turret member for movement about the axis of said shaft to a plurality of different working positions; first and second planar positioning faces spaced from and facing each other, respectively located in planes extending across said shaft axis, and respectively forming parts of said members, one of said positioning faces being formed with a plurality of first depressions equal in number to the number of working positions, being arranged along a first circle whose center is in said shaft axis, and each having three equidistantly spaced surface portions converging toward each other as the depth of said first depression increases, said first positioning face being formed with a plurality of second depressions equal in number to the number of working positions, being located along a second circle whose center is in said shaft axis, and each having a pair of surface portions facing each other and converging toward each other as the depth of said second depression increases, said second depressions being identically spaced from said first depressions, respectively, at each of said working positions; a first rigid projection fixed to one of said members, projecting from said positioning face thereof, and having a convex outer surface portion engaging the positioning face of the other of said members at only one point of contact at each of said working positions; a second rigid projection fixed to the other of said positioning faces, being spaced from said shaft axis by a distance equal to the radius of said first circle, being successively located in said first depressions as said turret is successively moved from one working position to the next working position, and having three outer, equidistantly spaced convex surface portions respectively engaging, at each of said working positions, the three surface portions of the first depression in which said second projection is located, said surface portions of said second projection each having a radius of curvature substantially smaller than the radius of curvature of each of said surface portions of said first depressions to provide at each working position three points of contact between said members, and said second projection being free, at each working position, at all parts of its outer surface except said three contact points; and a third projection fixed to and extending from said second positioning face, being located from said shaft axis by a distance equal to the radius of said second circle, being successively located in said second depressions as said turret is successively moved from one working position to the next working position, and having a pair of outer, opposed, convexly curved surface portions respectively engaging, at each working position, the pair of surface portions of the second depression in which said third projection is located, said surface portions of said third projection each having a radius of curvature substantially smaller than the radius of curvature of each of said surface portions of said second depressions to provide at each working position two points of contact between said members, and said third projection being free, at each working position, at all parts of its outer surface except said two points of contact thereof.

2. In a machine tool as defined in claim 1, a nut threadedly engaging said shaft and adapted to engage the top of said turret member for clamping the latter in said working positions, and a plurality of marks on said nut arranged to match with a mark on said turret member so that the latter may be clamped to said carriage member with the same degree of tightness at each working position.

3. In a machine tool as defined in claim 1, said first and second depressions being conical.

4. In a machine tool as defined in claim 1, said first depressions being conical and said second projection having a spherical outer surface.

5. In a machine tool as defined in claim 1, said first depressions being conical and said second depressions being in the form of grooves having a V-shaped cross-section.

6. In a machine tool as defined in claim 1, said second depressions being in the form of elongated V-shaped grooves and said third projection having an outer avoidal surface.

7. In a machine tool as defined in claim 1, said second projection having three spaced boses respectively provided with said three surface portions of said second projection.

References Cited in the file of this patent

UNITED STATES PATENTS

| Number | Name | Date |
|---|---|---|
| 2,202,117 | Muller | May 28, 1940 |
| 2,324,603 | Strobl | July 20, 1943 |
| 2,335,712 | Vitale | Nov. 30, 1943 |
| 2,403,405 | Sirola | July 2, 1946 |
| 2,471,403 | Benes | May 31, 1949 |
| 2,527,871 | Bakewell | Oct. 31, 1950 |
| 2,547,616 | Beekman | Apr. 3, 1951 |